United States Patent
Muller-Marc et al.

(10) Patent No.: US 9,733,468 B2
(45) Date of Patent: Aug. 15, 2017

(54) ELECTRICALLY CONTROLLABLE DISPLAY ELEMENT FOR AN OPTICAL DISPLAY DEVICE, AND CORRESPONDING PRODUCTION METHOD

(71) Applicant: advanced display technology AG, Appenzell (CH)

(72) Inventors: Oliver Muller-Marc, Appenzell (CH); Dieter Jerosch, Bad Soden (DE); Andriy Bitman, Dortmund (DE); Markus Rawert, Coesfeld (DE)

(73) Assignee: advanced display technology AG, Appenzell (CH)

( * ) Notice: Subject to any disclaimer, the term of this patent is extended or adjusted under 35 U.S.C. 154(b) by 210 days.

(21) Appl. No.: 14/414,161

(22) PCT Filed: Jul. 5, 2013

(86) PCT No.: PCT/US2013/001998
§ 371 (c)(1),
(2) Date: Apr. 17, 2015

(87) PCT Pub. No.: WO2014/008999
PCT Pub. Date: Jan. 16, 2014

(65) Prior Publication Data
US 2015/0316760 A1    Nov. 5, 2015

(30) Foreign Application Priority Data
Jul. 11, 2012  (DE) .................. 10 2012 013 725

(51) Int. Cl.
*G02B 26/00* (2006.01)
(52) U.S. Cl.
CPC ................... *G02B 26/005* (2013.01)

(58) Field of Classification Search
USPC ....... 359/290–292, 295, 296, 298, 237, 242, 359/244, 253, 265, 266, 269, 270, 271,
(Continued)

(56) References Cited

U.S. PATENT DOCUMENTS 9,013,779 B2 *  4/2015  Lee ..................... G02B 26/004
                                                  359/290
2006/0285067 A1  12/2006  Kim
(Continued)

FOREIGN PATENT DOCUMENTS

| DE | 102010013153 A1 | 9/2011 |
| WO | 2009036272 A1 | 3/2009 |
| WO | 2012026161 A1 | 3/2012 |

OTHER PUBLICATIONS

International Search Report for PCT Application PCT/EP2013/001998 dated Sep. 19, 2013.

*Primary Examiner* — Brandi Thomas
(74) *Attorney, Agent, or Firm* — McCormick, Paulding & Huber LLP

(57) ABSTRACT

The invention concerns an electrically controllable display element (1) for an optical display device, with a structured layer (2) that has a plurality pixels (3), and with at least one electrode layer (6) directly or indirectly over a structured side (2.1) of the structured layer (2), as well as with an active matrix (7) having thin film transistors, which has selectively controllable electrodes, such that individual or multiple particular pixels (3) can be charged with an electric field, characterized by the fact that the at least one electrode layer (6) extends in one piece over the structured side (2.1) of the structured layer (2), and that the active matrix (7) in the viewing direction is arranged on the display element (1) above the electrode layer (6).

19 Claims, 3 Drawing Sheets

(58) Field of Classification Search
USPC .......................................................... 359/272
See application file for complete search history.

(56) References Cited

U.S. PATENT DOCUMENTS

| | | |
|---|---|---|
| 2010/0033798 A1* | 2/2010 | Wang ..................... G02B 26/02 |
| | | 359/290 |
| 2010/0060974 A1 | 3/2010 | Wang et al. |
| 2011/0227080 A1 | 9/2011 | Roh et al. |

* cited by examiner

ELECTRICALLY CONTROLLABLE DISPLAY ELEMENT FOR AN OPTICAL DISPLAY DEVICE, AND CORRESPONDING PRODUCTION METHOD

CROSS-REFERENCE TO RELATED APPLICATION

This application is entitled to the benefit of and incorporates by reference subject matter disclosed in International Patent Application No. PCT/EP2013/001998 filed on Jul. 5, 2013 and German Patent Application DE102012013725.7 filed Jul. 11, 2012.

The invention concerns an electrically controllable display element for an optical display device with a structured layer that consists of a plurality of pixels, and with at least one electrode layer directly or indirectly on a structured side of the structured layer, as well as an active matrix consisting of thin film transistors, which has selectively controllable control electrodes in order to selectively apply an electric field to one or more specific pixels. The invention also concerns a corresponding manufacturing method. These types of display devices are known, for example, from US 2006/0285067 A1, from WO 2009/036272 A1 and from DE 10 2010 013 153 A1.

As is also described in the previously mentioned documents, it is standard practice to control display devices based on electro-wetting with the help of active matrices consisting of thin film transistors, as they are known from LCD production.

Because the active matrix in a display device using the current state of technology is located in the viewing direction under the structured layer on the display surface of the display element, the contact with each individual cell in the active matrix must be accomplished through the structured layer, which is optically disadvantageous and in particular entails a reduction of the aperture of the entire device. Along with the optical disadvantages, construction of the display element using the current state of technology entails a higher manufacturing cost.

The object of the invention is therefore to further develop a generic display element of the electric-fluid type for an optical display device, in such a way that it will have a large aperture and at the same time will be simple and cost-effective to manufacture.

SUMMARY OF THE INVENTION

The basic object of the invention is achieved according to the invention, in that at least one electrode layer extends in one piece over the structured side of the structured layer, and in that the structured side faces the active matrix.

By this means with the structured side arranged to face the active matrix contact penetration through the structured layer is no longer necessary for controlling the active matrix. This has the advantage that in the corresponding structured layer, no contact areas are present that could impair the screen image or the aperture of the display element. This results directly in a simplified and thus more cost-effective manufacture of the display element according to the invention. According to the invention it is even possible that all layers arranged under the active matrix, the structured layer, the electrode layer, any dielectric layer and any hydrophobic or other functional systems may be formed as homogeneous, complete and unstructured layers, and thus, for example, may be able to be manufactured in a continuous separate process, such that costly finishing, in particular, structuring steps, will not be absolutely necessary.

Construction of the display element according to the invention also permits in the manufacturing process inputs to be accepted up until the last, concrete stages of formation of the display element. While, for example, the structured layer with the separate functional layers can be manufactured as a standard component, the choice during manufacturing of an active matrix installed as a last step has, for example, an influence on the resolution and thus on the aperture of the device. Thus a few things about the choice of the active matrix can be put off until the last moment when it can be determined how many adjacent pixels need to be controlled by a cell of the active matrix.

In the preferred embodiment the display element is an electrofluidic display element, in particular, a display element based on electro-wetting, in which at least one of the pixels has a pixel volume that is in fluid communication with at least one reservoir, so that between the pixel volume and the respective reservoir an electrically conducting and/or polar fluid can move back and forth, and the active matrix is arranged in the viewing direction at a distance from the structured side of the structured layer.

It can further be provided that the active matrix has a number of control electrodes that can be switched separately by an electric voltage, with each control electrode being is associated with a particular pixel, and with the number of control electrodes being greater than or equal to the number of electrode layers.

In one embodiment of the invention the active matrix is formed on the underside of a transparent cover substrate defining the top of the display elements facing the electrode layer. In this manner it is possible, for example, to prepare the structured layer with the functional layers formed on it as a first subassembly, while the active matrix arranged on the cover substrate forms a second subassembly. While the first subassembly can be a standardized component, by the corresponding choice of the second subassembly, for example with respect to the cell size of the active matrix, decisions on essential characteristics of the display element can be made at the last minute in the manufacturing process.

Preferably each pixel has a pixel surface such that the display element over the pixel surface of at least one pixel is optically transparent in at least one wavelength region, if the pixel in question has a state in which it is optically transparent in the wavelength region.

It can be that above or below the pixel volume at least one color layer with a particular color, including white and black, is arranged with the electrically conducting and/or polar fluid being opaque, reflective, or absorbent in the optical region, and with a fluid that is transparent or absorbing for a particular optical wavelength present in the pixel volume, if the electrically conducting and/or polar fluid is in the reservoir.

In this case the preferred embodiment of the invention provides that above or below each pixel volume a separate color layer is placed, with the color layers being arranged in a matrix, such that in at least one direction along the matrix neighboring color layers have a different color, the colors of the color layers being chosen from the basic colors of a particular color space.

This can be achieved in an especially simple construction and manner if the at least one color layer is located on the underside of an optically transparent support substrate, on whose upper surface, opposite the lower surface, the display element is placed directly or indirectly over one of the structured sides of the structured layer.

An especially preferable way to achieve the electric connections of the active matrix is through the underside of the covering substrate and through one of the upper surfaces of the covering substrate facing the underside. This embodiment makes it possible for all of the electrical connections of the active matrix to be confined to the subassembly (see above) associated with the active matrix. The subassembly that contains the structured layers, the electrode layers and layers for other functions that may be present, has no means or provisions serving for the connection of the active matrix. This subassembly is thus for this reason particularly simple and cost-effective to manufacture.

The manufacturing procedure according to the invention has the following steps:

a) preparing a structured layer that has a number of pixels;

b) placing at least one electrically conducting, transparent electrode layer directly or indirectly over a structured side of the structured layer; and c) arranging an active matrix having thin film transistors, with selectively controllable control electrodes, at a given distance from the electrode layer, characterized by the fact that, in step b) the at least one electrode layer is placed as a single piece over the structured side of the structured layer, and that in step c) the structured side faces the active matrix.

In the preferred embodiment, at least one of the pixels has a pixel volume that is in fluid communication with at least one reservoir, so that an electrically conducting and/or polar fluid can move back and forth between the pixel volume and the reservoir.

The preferred embodiment of the manufacturing procedure can also provide that after step b) an unstructured, one piece dielectric layer, which may be followed by a hydrophobic layer, which may have no holes in it or may have holes in it for the placement of adhesives, is placed on the electrode layer. While the dielectric layer serves to achieve an optimal distribution of the electrically conducting and polar fluid in the pixel volume when it is charged with an electric field, the hydrophobic layer has the function of achieving an optimally continuous and uniform displacement of the electrically conducting and polar fluid from the pixel volume into the reservoir, when the electric field is turned off.

In the preferred embodiment provision is also made that the structured layer in step a) is prepared on an optically transparent substrate, with the process also providing a color layer with a given color, including white and black, being placed on one of the sides of the substrate facing the structured layer.

The particularly simple manufacture of the display element according to the invention is achieved by the fact that the structured layer, the electrode layer and, if present, the dielectric layer and/or the hydrophobic layer and/or the color layer and/or the color layers are placed on a first substrate, and the active matrix is placed on a second substrate, with the process also featuring placement of the first and second substrates in relation to one another, in such a way that the active matrix is located at a certain distance from the structured layer and from the electrode layer. The first substrate with its layered structure and the second substrate with the active matrix can thus be manufactured separately from one another and can be assembled together only in a final work phase in the manner described above to form the display element according to the invention.

BRIEF DESCRIPTION OF THE DRAWINGS

Other details of the invention are described with the help of the following figures. These show.

DESCRIPTION OF THE PREFERRED REQUIREMENTS

Figure 1:
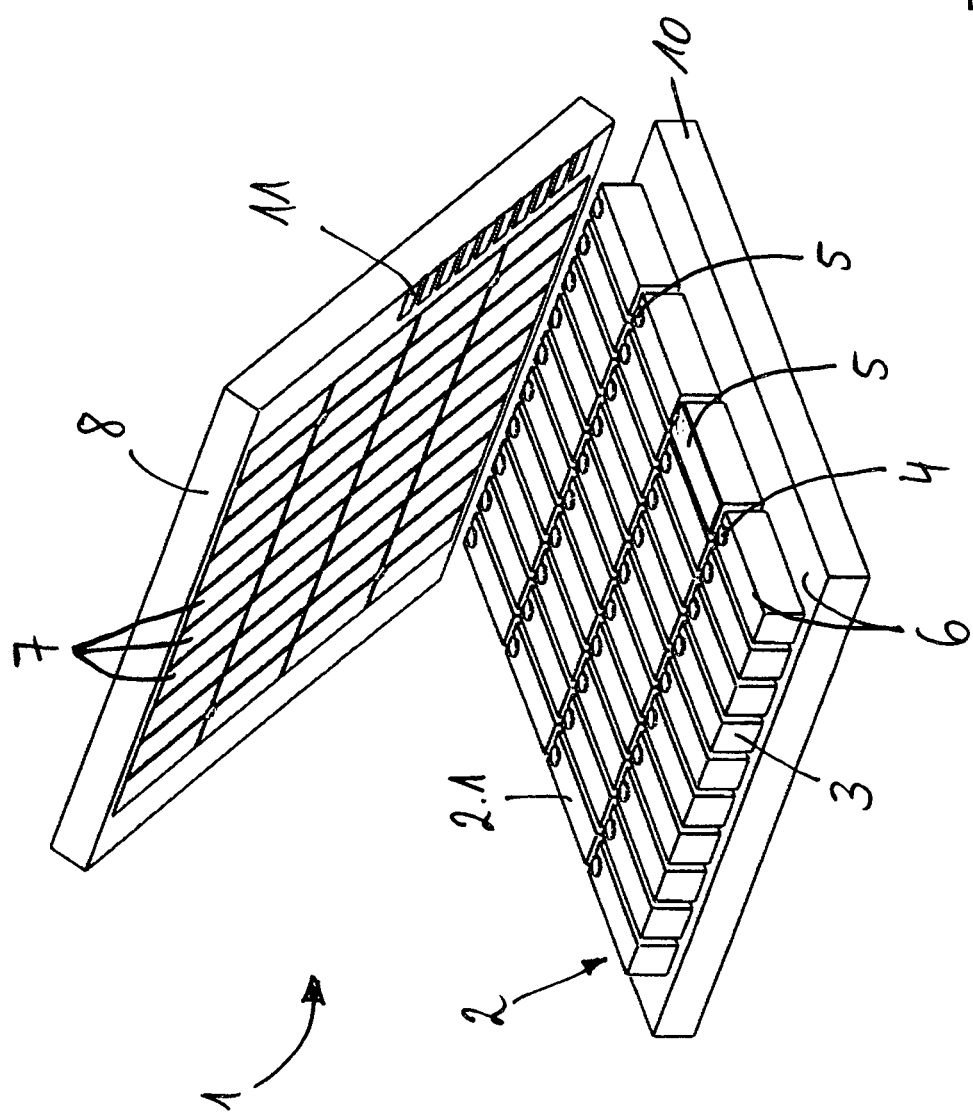
FIG. 1 the electric fluid display element in perspective drawing according to the preferred embodiment of the invention, in which for better visualization the first and second subassemblies have not yet been assembled together.

In the display element 1 based on electro-wetting, as shown in FIG. 1, according to the preferred embodiment of the invention the first subassembly consists of a first substrate 10, onto which the structured layer 2 is placed with its structured side 2.1. Layer 2 can, for example, be a structured polymer layer, with the structuring of the polymer layer possibly occurring after its placement on the support substrate. After the structured layer 2 is placed on the supporting substrate 10, there follows the installation of a layer of transparent conductive material, for example a TCO, for the production of the electrode layer 6. The electrode layer 6 can, by using a common layering technique, be placed over the entire surface of the first substrate or can be cohesively adhered to the structured layer as a separate unstructured layer. It is, however, also conceivable that the electrode layer and other functional layers may be formed as separate layers. In the described embodiment no subsequent processing of the electrode layer 6 is necessary. After the electrode layer 6 has been applied, a likewise unstructured dielectric layer followed by a hydrophobic layer without holes can also be applied. The first subassembly based on the support substrate 10 thus has only one structured layer, which is layer 2, and besides this only homogeneous, unstructured layers, so that the manufacturing process is greatly simplified.

In the embodiment shown in the Figures the pixel volumes 3 are formed in a rectangular shape, and on one long-sided end of each rectangular pixel volume 3 is a reservoir 4, in which an electrically conducting and/or polar fluid is contained.

The individually controllable electrodes that are necessary for the manufacture of the electric fluid display element are provided by a second subassembly, which along with the support substrate 8 has an active matrix 7. It should be noted that the individual electrodes of the active matrix 7 have physical dimensions that largely correspond to the dimensions of the open upper surfaces of the pixel volume 3. It is easy to understand that the aperture and the resolving power of the embodiment described here can quite easily be varied by the surfaces of the individual electrodes of the active matrix 7. Thus, for example, it is conceivable that in the active matrix 7 according to FIG. 1, pairs of two adjacent electrodes can be formed as one electrode, or by way of the control electronics of the display element 1 can be similarly controlled, whereby the resolving power of the display element 1 according to FIG. 1 would be reduced and its aperture expanded correspondingly.

The subassembly provided by the support substrate 10 can therefore be a component that is essentially standardized, while essential characteristics of the display element 1 are left to the choice of the active matrix and thus to the subassembly formed with the covering substrate 8.

Figure 2:
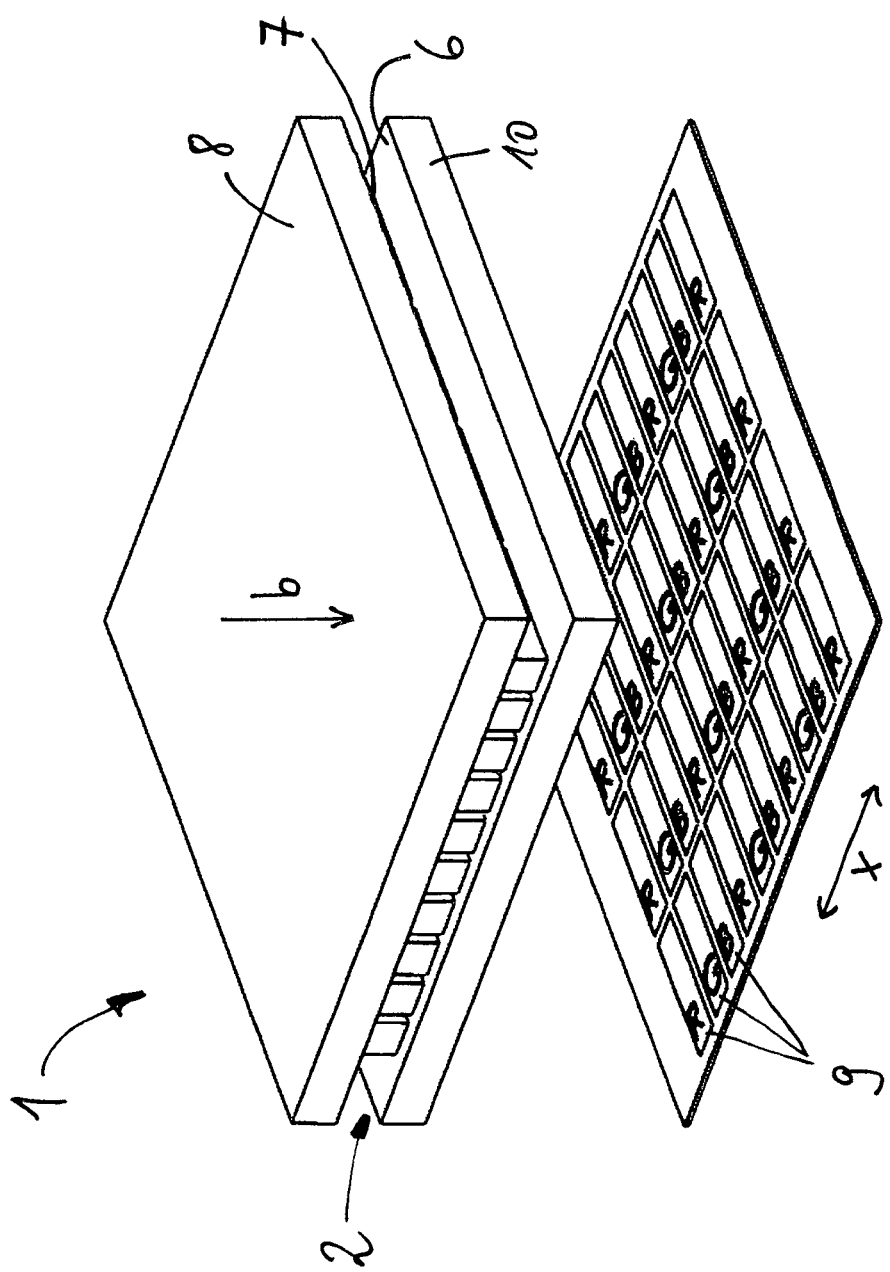
FIG. 2 the embodiment according to FIG. 1, after the first and second subassemblies are joined together, with separated color layers for better visualization.
Figure 3:
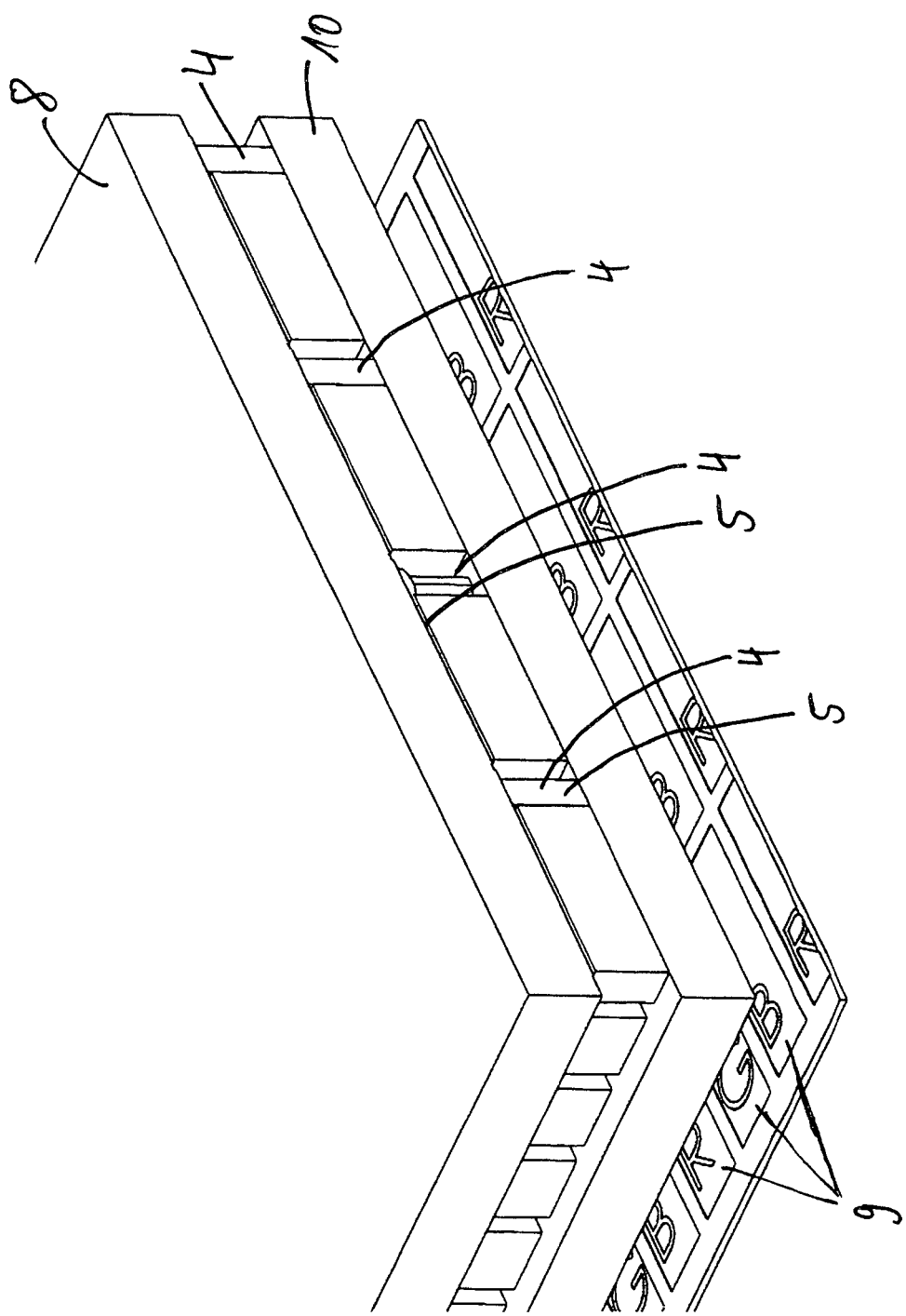
FIG. 3 a detailed cutaway view of the embodiment according to FIGS. 1 and 2.

The image in FIG. 2 shows color layers 9 on the underside of the support substrate 10, whereby along axis x of the matrix color layers 9 with three different colors are arranged in a periodic sequence next to one another. These can be, for example, the colors red, green, blue from the RGB color space. In the axis perpendicular to axis x color layers of the same colors are repeated. As is to be understood, to each particular pixel volume 3, a separate underlying color layer 9 is allotted. According to whether the opaque, electrically conductive and/or polar fluid 5 is located in reservoir 4 or in pixel volume 3 (see FIG. 3), the underlying color layer 9 will or will not be visible. It is to be understood that the embodiment according to FIGS. 1 to 3 is appropriate for the manufacture of both transmissive and reflective display elements.

FIG. 1 shows the special advantage of the invention relative to the current state of technology. The construction according to the invention allows the contact arrangement 11 of the active matrix 7 to pass perpendicularly through the upper side and the lower side of the cover substrate 8. Therefore no further outgoing connections through other layers are necessary. In particular, a pass through contact arrangement for the structured layer 2 is not provided according to the invention.

The features of the invention made apparent stated in the above description, in the drawings and in the claims can, individually as well as in desired combinations, be essential for the realization of the invention.

LIST OF REFERENCE SIGNS

1 Display element
2 Structured layer
2.1 Structured side of the structured layer
3 Pixel volume
4 Reservoir
5 Electrically conductive, polar fluid
6 Electrode layer
7 Active matrix
8 Second substrate (cover substrate)
9 Color layer
10 First substrate (support substrate)
11 Contact arrangement for the active matrix
b Viewing direction
x Axis of the matrix

What is claimed is:

1. An electrically controllable display element (1) for an optical display device, with a structured layer (2), that has plurality of spatially arranged pixels (3), each with a pixel volume (3) that stands in fluid communication with at least one reservoir (4) and with at least one electrode layer (6) directly or indirectly on a structured side (2.1) of the structured layer (2), as well as an active matrix (7) consisting of thin film transistors, which has selectively controllable control electrodes, in order to selectively apply an electric field to one or more specific pixels (3), so that between the pixel volume (3) and the associated reservoir (4) an electrical conducting and/or polar fluid (5) is movable back and forth, wherein the at least one electrode layer (6) extends in one piece over the structured side (2.1) of the structured layer (2) including spaces between adjacent pixels, and wherein the structured side (2.1) is arranged to face the active matrix (7).

2. The display element (1) according to claim 1, in which the display element (1) is an electric-fluid based, in particular an electric-wetting-based display element and in which the active matrix (7) is placed at a distance from the structured side (2.1) of the structured layer (2).

3. The display element (1) according to claim 1, in which the active matrix has a number of control electrodes that can be charged separately with an electric voltage, wherein each control electrode is assigned to a particular pixel, and in which the number of control electrodes is larger than or equal to the number of electrode layers (6).

4. The display (1) according to claim 1, in which the active matrix (7) is formed on the underside of a transparent cover substrate (8) defining the top of the display element (1), which underside faces the electrode layer (6).

5. The display element (1) according to claim 1, in which above or below the pixel volume (3) at least one color layer (9) with a specific color, including black or white, is placed, with the electrically conducting and/or polar fluid (5) being opaque, reflective or absorbent in the optical region, and in which in the pixel volume (3) a fluid is contained that is transparent or absorbs a particular optical wave length, when the electrically conducting, polar fluid (5) is in the reservoir (4).

6. The display element (1) according to claim 5, in which above or below each pixel volume (3) is a separate color layer (9), with adjacent color layers (9) above or below adjacent pixel volumes being arranged in a matrix, so that in at least one direction (x) of the matrix adjacent color layers (9) have different colors chosen from the basic colors of a given color space.

7. The display element (1) according to claim 5, in which the at least one color layer (9) is provided on the underside of an optically transparent support substrate (10), and in which the underside of the overlying upper side of the display element (1) is placed directly or indirectly, over one of its structured side of the structured layer (9).

8. The display element (1) according to claim 1, in which each pixel has a pixel surface, and in which the display element (1) over at least one pixel surface is optically transparent for at least one wave length region, if the pixel in question has a state in which it is optically transparent in that one wave length region.

9. The display element (1) according to claim 4, in which electrical connection with the active matrix (7) formed on the underside of the cover substrate (8) is made through an upper side of the cover substrate (8) overlying the underside.

10. A manufacturing procedure for an electrically controllable display element (1) for an optical display apparatus, that has the following steps:
a) preparing a structured layer (2) that has a plurality of spatially arranged pixels (3) each with one pixel volume (3) that is in fluid communication with at least one reservoir (4);
b) placing at least one electrically conductive transparent electrode layer (6) directly or indirectly over a structured side (2.1) of the structured layer (2); and
c) arranging an active matrix (7) having thin film transistors, that has selectively controllable control electrodes, at a certain distance from the electrode layer (6), so that an electrical conducting, polar fluid (5) is movable back and forth between the pixel volume (3) and the associated reservoir (4), wherein in step b) at least one continuous electrode layer (6) is attached over the spatially arranged pixel volumes at the structured side of the structured layer (2), and that in step c) the structured side (2.1) faces the active matrix (7).

11. The manufacturing procedure according to claim 10, in which after step b) an unstructured, one-piece, dielectric layer, which may be followed by a hydrophobic rendering treatment, that is hole-less or has gaps to accommodate adhesive spots is attached to the electrode layer (6).

12. The manufacturing procedure according to claim 10, in which the structured layer (2) in step a) is made of an optically transparent substrate (10), and in which the procedure also includes the attachment of a color layer (9) with a particular color, including white or black, onto one of the sides of the substrate (10) facing the structured layer (2).

13. The manufacturing procedure according to claim 10, in which the structured layer (2), the electrode layer (6) and, if present, a dielectric layer and/or a hydrophobic and/or a color layer (9) and/or color layers (9) are applied on the first substrate (10), and the active matrix (7) is applied on a second substrate (8), such that the procedure features the arrangement of the first and second substrates (8, 10) in such a way that the active matrix (7) is a given distance from the structured layer (2) and from the electrode layer (6).

14. The display element (1) according to claim 2, in which the active matrix has a number of control electrodes that can be charged separately with an electric voltage, wherein each control electrode is assigned to a particular pixel, and in which the number of control electrodes is larger than or equal to the number of electrode layers (6).

15. The display element (1) according to claim 2, in which the active matrix (7) is formed on the underside of a transparent cover substrate (8) defining the top of the display element (1), which underside faces the electrode layer (6).

16. The display element (1) according to claim 3, in which the active matrix (7) is formed on the underside of a transparent cover substrate (8) defining the top of the display element (1), which underside faces the electrode layer (6).

17. The display element (1) according to claim 2, in which above or below the pixel volume (3) at least one color layer (9) with a specific color, including black or white, is placed, with the electrically conducting and/or polar fluid (5) being opaque, reflective or absorbent in the optical region, and in which in the pixel volume (3) a fluid is contained that is transparent or absorbs a particular optical wave length, when the electrically conducting, polar fluid (5) is in the reservoir (4).

18. The display element (1) according to claim 3, in which above or below the pixel volume (3) at least one color layer (9) with a specific color, including black or white, is placed, with the electrically conducting and/or polar fluid (5) being opaque, reflective or absorbent in the optical region, and in which in the pixel volume (3) a fluid is contained that is transparent or absorbs a particular optical wave length, when the electrically conducting, polar fluid (5) is in the reservoir (4).

19. The display element (1) according to claim 4, in which above or below the pixel volume (3) at least one color layer (9) with a specific color, including black or white, is placed, with the electrically conducting and/or polar fluid (5) being opaque, reflective or absorbent in the optical region, and in which in the pixel volume (3) a fluid is contained that is transparent or absorbs a particular optical wave length, when the electrically conducting, polar fluid (5) is in the reservoir (4).

* * * * *